2,892,843

Patented June 30, 1959

2,892,843
PREPARATION OF ETHYLENE UREA

Leonard Levine, Freeport, Tex., assignor to The Dow Chemical Company, Midland, Mich., a corporation of Delaware No Drawing. Application April 30, 1958
Serial No. 731,893

5 Claims. (Cl. 260—309.7)

The present invention relates to an improved process for the preparation of alkylene ureas and is more particularly concerned with a new and useful method for the preparation of ethylene urea and propylene urea.

Ethylene urea has been prepared in the past by heating ethylenediamine with diethyl carbonate at 180° C. (E. Fisher, Koch, A 232, 227 (1886)), by warming an aqueous solution of N,N'-ethylene thiourea with freshly precipitated mercuric oxide (Klut, Ar. 240, 677 (1887)) and by distillation of aqueous N,N'-ethylene guanidine under diminished pressure (Pierron A 9 (11) 363 (1908)). More recently, ethylene urea has been prepared by reacting carbon dioxide and ethylenediamine at pressures of 10 to 1000 atmospheres and temperatures of 175° to 300° C. Further, the carbonyl group required in this reaction may be derived from sources other than carbon dioxide, such as for example urea, ammonium carbonate, ethyl carbonate, and phosgene. The ethylene radical required for the afore described process may be obtained from the ethylenediamine or from, for example, ethanolamine, ethylene glycol, ethylene oxide, or ethylene dichloride. Further, ethylene urea can be prepared by the reaction of carbonyl sulfide with ethylenediamine in a volatile, non-reactive, organic solvent.

It is an object of the invention to provide a new and useful process for the preparation of alkylene ureas and particularly ethylene urea and propylene urea from the corresponding carbonate. A further object of the present invention is to provide a process for the preparation of alkylene ureas from readily available raw materials which are easily handled. These and other objects will become apparent to those skilled in the art from the following descriptions and claims.

It has now been discovered that alkylene ureas, and particularly ethylene urea and propylene urea, can be prepared by reacting an alkylene carbonate, such as ethylene or propylene carbonate, with ammonia. These reactions of ethylene carbonate and propylene carbonate with ammonia may be represented empirically as follows:

(1) 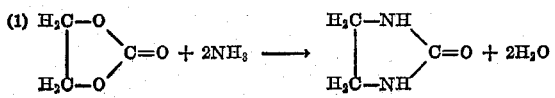

(2) 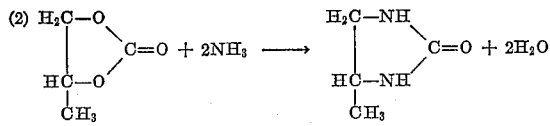

The reaction proceeds smoothly at temperatures between 200° and 290° C., and at autogenous pressures and preferably at a temperature within the range from 250° to 280° C. Below about 200° C., ethylene urea is not formed, and above about 290° C., decomposition of the product occurs. The heating of the reaction mixture is continued for from about 0.5 to 3 hours and preferably for from 1.5 to 2 hours. Little reaction occurs when a period of less than 0.5 hour is used, whereas a longer time period causes some decomposition of the reactants and the reaction product, thus resulting in lowered yields.

The following example is illustrative of the present invention but is not to be construed as limiting.

Example 1

45 ml. (1.6 moles) of liquid ammonia was introduced into a 300 ml. bomb-type container maintained at $-70°$ C. containing 44 grams (0.5 mole) of ethylene carbonate. The bomb was sealed, placed in a rocking autoclave and heated to 270° C. and maintained thereat for 2 hours. The pressure during this period rose to about 100 atmospheres. Thereafter, the bomb was cooled and depressurized. 15 milliliters (33 percent) of the ammonia introduced was recovered on venting and the remaining residue was extracted with hot propanol and filtered. The solvent was removed from the filtrate by vacuum distillation to obtain 9 ml. of ethylene glycol and 12.5 grams of ethylene urea. The later represented a yield of 29 percent.

By replacing the ethylene carbonate used in the above example with an equivalent amount of propylene carbonate, propylene urea is produced.

I claim:

1. A process for the manufacture of 2-imidazolidinones which comprises reacting a 1,2-alkylene carbonate with ammonia at a temperature of from 200° to 290° C. and at least autogenous pressure.

2. A process for the manufacture of ethylene urea which comprises reacting ethylene carbonate with ammonia at a temperature of from 200° to 290° C. and at least autogenous pressure.

3. A process for the manufacture of ethylene urea which comprises reacting ethylene carbonate with ammonia at a temperature of from 250° to 280° C. and at least autogenous pressure.

4. A process for the manufacture of 4-methyl-2-imidazolidinone which comprises reacting propylene carbonate with ammonia at a temperature of from 200° to 290° C. and at least autogenous pressure.

5. A process for the manufacture of 4-methyl-2-imidazolidinone which comprises reacting propylene carbonate with ammonia at a temperature of from 250° to 280° C. and at least autogenous pressure.

No references cited.